United States Patent [19]

Lee

[11] Patent Number: 5,504,936
[45] Date of Patent: * Apr. 2, 1996

[54] MICROCELLS FOR DIGITAL CELLULAR TELEPHONE SYSTEMS

[75] Inventor: William C. Lee, Danville, Calif.

[73] Assignee: AirTouch Communications of California, San Francisco, Calif.

[*] Notice: The portion of the term of this patent subsequent to Jun. 5, 2007, has been disclaimed.

[21] Appl. No.: 263,129

[22] Filed: Jun. 21, 1994

Related U.S. Application Data

[63] Continuation of Ser. No. 52,636, Apr. 26, 1993, abandoned, which is a continuation-in-part of Ser. No. 679,521, Apr. 2, 1991, Pat. No. 5,243,598.

[51] Int. Cl.$^6$ .............................. H04B 7/26; H04Q 7/22; H04Q 7/36
[52] U.S. Cl. .................. 455/33.2; 455/33.4; 455/54.1; 455/56.1; 379/60
[58] Field of Search .................................. 455/33.1–33.4, 455/34.1, 34.2, 53.1, 54.1, 54.2, 56.1, 67.1; 379/59, 60, 63; 375/205

[56] References Cited

U.S. PATENT DOCUMENTS

| | | | |
|---|---|---|---|
| 4,128,740 | 12/1978 | Graziano | 455/33.1 |
| 4,144,409 | 3/1979 | Utano et al. | |
| 4,144,411 | 3/1979 | Frenkiel | |
| 4,189,677 | 2/1980 | Cooper et al. | |
| 4,485,486 | 11/1984 | Webb et al. | |
| 4,525,861 | 6/1985 | Freeburg | 455/33.1 |
| 4,639,914 | 1/1987 | Winters | 370/110.1 |
| 4,644,560 | 2/1987 | Torre et al. | 375/1 |
| 4,675,863 | 6/1987 | Paneth et al. | 370/50 |
| 4,704,734 | 11/1987 | Menich et al. | |
| 4,727,590 | 2/1988 | Kawano et al. | |
| 4,759,051 | 7/1988 | Han | 379/59 |
| 4,775,998 | 10/1988 | Felix et al. | 379/59 |

(List continued on next page.)

FOREIGN PATENT DOCUMENTS

| | | |
|---|---|---|
| A202995678 | 6/1987 | European Pat. Off. |
| 0265178 | 4/1988 | European Pat. Off. |
| 0329997 | 8/1989 | European Pat. Off. |
| A20359535 | 3/1990 | European Pat. Off. |
| 0364190 | 4/1990 | European Pat. Off. |
| 0368673 | 5/1990 | European Pat. Off. |
| A20451694 | 10/1991 | European Pat. Off. |
| 02502135 | 7/1990 | Japan. |
| WO92-10890 | 6/1992 | WIPO. |

OTHER PUBLICATIONS

K. Suzuki, E. Niikura and N. Morita, "A New Method Which Optimizes Frequency Reuse in Cellular Radio Systems", *IEEE*, Chapter 1951–Mar. 1984, pp. 322–327.

(List continued on next page.)

*Primary Examiner*—Edward F. Urban
*Assistant Examiner*—Chi H. Pham
*Attorney, Agent, or Firm*—Merchant, Gould, Smith, Edell, Welter & Schmidt

[57] ABSTRACT

A cellular telephone system is described of the type wherein a plurality of contiguous cells, each having an assigned set of identification codes, are arranged with means for maintaining continuous communication with mobile telephones moving from cell to cell. The system allows multiple access by including means for assigning at least one of the in the assigned set of identification codes to more than one mobile telephone. A unique identification code is assigned to a mobile telephone located in the cell. A signal having a unique identification code is generated for identifying the mobile telephone. The signal is coupled to the zones. A combiner is also provided for combining signals from all of the zones in the cell. A receiver is coupled to the combiner for retrieving the signals having the code. According to another aspect of the invention, the signal coupled to the zones is delayed so that the transmission of the signal among the plurality of antenna sets is delayed by a preselected amount so as to reduce interference caused by successive reception of signals.

9 Claims, 10 Drawing Sheets

U.S. PATENT DOCUMENTS

| | | | |
|---|---|---|---|
| 4,783,780 | 11/1988 | Alexis . | |
| 4,785,450 | 11/1988 | Bolgiano et al. . | |
| 4,790,000 | 12/1988 | Kinoshita | 379/59 |
| 4,797,947 | 1/1989 | Labedz . | |
| 4,799,253 | 1/1989 | Stern et al. | 379/59 |
| 4,817,157 | 3/1989 | Gerson . | |
| 4,872,205 | 10/1989 | Smith . | |
| 4,876,740 | 10/1989 | Levine et al. . | |
| 4,901,307 | 2/1990 | Gilhousen et al. | 570/18 |
| 4,932,049 | 6/1990 | Lee | 379/60 |
| 4,955,082 | 9/1990 | Hattori et al. . | |
| 4,972,456 | 11/1990 | Kaczmarek et al. | 379/59 |
| 5,056,109 | 10/1991 | Gilhousen et al. | 375/1 |
| 5,067,147 | 11/1991 | Lee | 379/60 |
| 5,073,900 | 12/1991 | Mallinckrodt | 375/1 |
| 5,101,501 | 3/1992 | Gilhousen et al. . | |
| 5,103,459 | 4/1992 | Gilhousen et al. | 375/1 |
| 5,109,390 | 4/1992 | Gilhousen et al. | 375/1 |
| 5,128,959 | 7/1992 | Bruckert | 375/1 |
| 5,150,377 | 9/1992 | Vannucci | 375/1 |
| 5,193,109 | 3/1993 | Lee | 379/60 |
| 5,243,598 | 9/1993 | Lee | 370/95.3 |

OTHER PUBLICATIONS

Jan–Erik Stjernvall, "Calculation of Capacity and Co–Channel Interference In A Cellular System", Nordic Seminar on Digital Land Mobile Radiocommunication, Feb. 5–7, 1985, Espoo, Finland, pp. 2209–2217.

J. Whitehead, "Cellular System Design: An Emerging Engineering Discipline", *IEEE Comm. Mag.*, 24:2, Feb. 1986, pp. 8–15.

W. C. Lee, "Ch. 14, Digital Systems", *Mobile Cellular Telecommunications Systems,* Gonneau and Margolies (Ed.), 1986, pp. 401–434.

37th IEEE Vehicular Technology Conference, Jun. 1987, Tampa, Halpern "Introduction of the Digital Narrow–Band Channel Technology into the Existing Cellular Spectrum in the United States".

W. C. Lee, "Overview of Cellular CDMA", *IEEE,* May 1991, vol. 40, No. 2, pp. 291–302.

W. C. Lee, "Implications of CDMA for Cellular System Operations", GLOBECOM 1990 San Diego (Workshop #2–Digital Cellular Telephony Technology and Standards in the MarketPlace), pp. 1–27.

W. C. Lee, "Theory of Wideband Radio Propagation", *IEEE* 41st VTS Conference, May 19, 1991, (see entire document).

W. C. Lee, "Getting Down to the Nitty–Gritty of CDMA", *Sonnet Update,* TE&M's May 1, 1991, pp. 72–79.

Ira A. Gerson and Mark A. Jasiuk: "Vector Sum Excited Linear Prediction (VSELP) Speech Coding at 8 KBPS," Chicago Corporate Research and Development Center, Motorola Inbc., Schaumburg, IL, Int. Conf. on Acoustics, Speech and Signal Processing, Apr. 1990.

MICROCELLS FOR DIGITAL CELLULAR TELEPHONE SYSTEMS

This is a continuation of application Ser. No. 08/052,636, filed Apr. 26, 1993, now abandoned, which is a continuation-in-part of application Ser. No. 07/679,521, filed Apr. 2, 1991, now U.S. Pat. No. 5,243,598.

FIELD OF THE INVENTION

This invention relates generally to cellular telephone systems. More particularly, the invention relates to a digital multiple access communication system for cellular telephone systems.

BACKGROUND OF THE INVENTION

In a typical analog cellular telephone system, a plurality of contiguous cells, each having a different assigned set of transmission frequencies, are arranged with handoff means for maintaining continuous communication with mobile telephones moving from cell to cell. As a mobile unit travels along a path that passes from one cell to another, a handoff occurs which switches the mobile unit from a frequency in the set assigned to the cell it is leaving, to a new frequency in the set assigned to the cell it is entering. The handoff action is controlled by a mobile telephone switching office (MTSO) which receives a handoff command or instruction. The handoff command is typically generated when the signal received from the mobile telephone falls below a preselected signal strength thus indicating that the mobile telephone is at the cell boundary.

In an analog system, each cell in a cellular telephone system operates with a different assigned set of transmission frequencies. As a mobile telephone passes from one cell to another, the handoff signal instructs the cell which the mobile telephone is entering to begin transmitting at a frequency which is different from the frequency which was being transmitted by the cell which the mobile telephone was leaving. A similar procedure is followed when the mobile telephone passes into the next contiguous cell. Sets of assigned frequencies are different for adjacent cells, and such sets are not repeated except for cells that are far enough away from each other so that interference problems will not occur. In the case of systems using identification codes, the identification codes are generally not repeated.

A mobile telephone unit typically contains a control unit, a transceiver, and an antenna system. Each cell site typically is provided with a control unit, radio, a power plant, data-terminals, and antennas. The MTSO provides coordination for all the cell sites and contains suitable processing and switching means. The MTSO also interfaces with the telephone company zone offices for standard hardwired telephone systems. The communication links between the MTSO and the various cell sites are typically microwave, T carriers, or optical fiber, and carry both voice and control data between the cell sites and the MTSO.

When a user sitting in a car activates the receiver of the mobile unit, the receiver scans a plurality of set-up channels which are designated among the total channels assigned to the cell. Typically, there may be 21 set-up channels out of a total of 416 channels. (The remainder are communication channels.) The receiver then selects the strongest set-up channel and locks on for a certain time. Each site is assigned a different set-up channel. Accordingly, locking onto the strongest set-up channel usually means selecting the nearest cell site. This self-location scheme is used in the idle stage and is user-independent. It has a great advantage because it eliminates the load on the transmission at the cell site for locating the mobile unit. The disadvantage of the self-location scheme is that no location information of idle mobile units appears at each cell site. Therefore, when the call initiates from a standard non-mobile or land line to a mobile unit, the paging process is longer. Since a large percentage of calls originates at the mobile unit, the use of self-location schemes is justified. After a delay, for example, one minute, the self-location procedure is repeated.

To make a call from a mobile unit, the user places the called number into an originating register in the mobile unit, checks to see that the number is correct, and pushes a "send" button. A request for service is sent on a selected set-up channel obtained from a self-location scheme as described above. The cell site receives it, and in directional cell sites, selects the best directive antenna for the voice channel to use. At the same time the cell site sends a request to the MTSO via a high-speed data link. The MTSO selects an appropriate voice channel for the call, and the cell site acts on it through the best directive antenna to link the mobile unit. The MTSO also connects the wire-line party through the telephone company central office.

When a land-line party dials a mobile unit number, the telephone company central office recognizes that the called number is mobile and forwards the call to the MTSO. The MTSO sends a paging message to certain cell sites based on the mobile unit number and a suitable search algorithm. Each cell site transmits the page on its own set-up channel. The mobile unit recognizes its own identification on a strong set-up channel, locks onto it, and responds to the cell site. The mobile unit also follows the instruction to tune to an assigned voice channel and initiate an audible signal to alert the user to the incoming call.

When the mobile user is finished with the call, the hang up turns off the transmitter, and a particular signal (signaling tone) transmits to the cell site and both sides free the voice channel. The mobile unit resumes monitoring pages through the strongest set-up channel.

During a call, two parties are on a voice channel. When the mobile unit moves out of the coverage area of a particular cell site, the reception becomes weak. The present cell site requests a handoff via an appropriate signal, for example, a 100 ms burst on the voice channel. The system switches the call to a new frequency channel or a different cell identification code in a new cell site without either interrupting the call or alerting the user. The call continues as long as the user is talking. The user does not notice the handoff occurrences.

When call traffic in a particular area increases, increased capacity may be generated by reducing the area covered by a particular cell, i.e., creating a microcell. For example, if a cell is split into four smaller cells, each with a radius of one-half the original, traffic is increased four fold. Naturally, the smaller the cell, the more handoffs required in a cellular telephone system for a given capacity.

Although in the proper circumstances, reduced cell size is advantageous, certain problems can arise. Very often when cell size is reduced, for example to a radius of less than one mile, very irregular signal strength coverage will result. This may be caused by buildings and other structures, and can therefore become highly dependent upon the location of the mobile unit. Other problems arise in connection with signal interference. Although some cellular telephone systems have employed several sets of frequencies in a small single cell, in an attempt to improve capacity in that cell, this prevents the reuse of the same frequencies or adjacent frequencies in the neighboring cells. The overall capacity of the system thereby decreases, since the number of available channels in a system is proportional to the inverse of the number of different frequency sets employed.

A cellular telephone system in which an antenna set configuration leads to a more uniform signal coverage contour and lowered interference levels is described in U.S. Pat. No. 4,932,049 issued to Lee. The cellular telephone system comprises cells which contain a plurality of antenna sets arranged and configured to limit propagation of signals substantially to one of a plurality of zones or sectors within the boundaries of the cells. The zones or sectors are substantially less in area than the area of the cell. Transmission at any one frequency (of the assigned set of transmission frequencies for the cell) is confined to the zone or sector wherein the mobile telephone has been assigned to such one frequency. Frequency handoff occurs while the mobile unit moves to a different cell.

In order to optimize the usage of the assigned set of transmission frequencies in a zoned or sectored cell described above, multiple access schemes allowing more than one user to use a communication channel could be implemented in the cell. Multiple access is possible because most users of a voice communication system do not fully utilize the capacity of the communication system. More specifically, a typical user who is allocated a channel in the communication system only actively uses the voice channel for a fraction of its allocated time. As an example, a typical user using a voice channel generally speaks for half of the time and listens for the remaining times. Thus the communication-channel is then left unused for at least half of the time. By appropriate identifying by user time slot or code, bursts or pockets of voice signals for different users in digital systems may be transmitted thereby increasing the user capacity of the system.

Analog multiple access schemes such as analog frequency division multiple access have been implemented in cellular telephone systems. Digital multiple access schemes including digital frequency division multiple access, time division multiple access, and code division multiple access have been developed, and it is anticipated that they will also be implemented in cellular telephone systems. It is advantageous to implement a multiple access scheme using digital means. This is because digital communication typically offers better performance, higher capacity, and lower cost. It should be noted that the applications of digital communication are not limited to communicating digital data. Analog voice signal can enjoy the benefits of digital communication by first converting the analog voice signal to a digital signal before transmission. After the digital signal is received by a receiver, the digital signal is then converted back to the analog voice signal.

One of the reasons for the improved performance in a digital communication system is that the system is more tolerant to noise. This is because a threshold level of noise energy is required to change the state of a digital signal. Thus, the communication is relatively error free if the noise energy of the communication medium is below the required level. In addition, it is possible to implement error detection and correction algorithms which further reduce the error rate even if the communication medium is relatively noisy. As a result, it is possible to set up communication channels under noisy environment thereby increasing the capacity of the communication system.

Another reason for the improved performance is that digital data can be easily manipulated using digital processors. Thus, many operations which are difficult to implement using analog means can be implemented using low cost microprocessors and digital logic circuits.

SUMMARY OF THE INVENTION

In accordance with the invention, an improved cell configuration leads to a more uniform signal coverage contour, lowered interference levels, increased capacity, improved voice quality, and relatively simple and economical construction. The improved cell includes a master site and a plurality of zone sites. The improved cell also includes a plurality of antenna sets, each set being suitably positioned within the periphery of the cell to cover a corresponding zone and having transmitting and receiving means directionally configured to limit propagation of signals substantially to a zone within the boundaries of the cell.

In the CDMA system according to the present invention, a unique identification code is assigned to a mobile telephone located in the cell. A signal having a unique identification code is generated for identifying the mobile telephone. The signal is coupled to the zones. A combiner is also provided for combining signals from all of the zones in the cell. A receiver is coupled to the combiner for retrieving the signals having the code. According to another aspect of the invention, the signal coupled to the zones is delayed so that the transmission of the signal among the plurality of antenna sets is delayed by a preselected amount so as to reduce interference caused by successive reception of signals by the mobile telephone located in the cell.

DETAILED DESCRIPTION OF THE INVENTION

Figure 1:
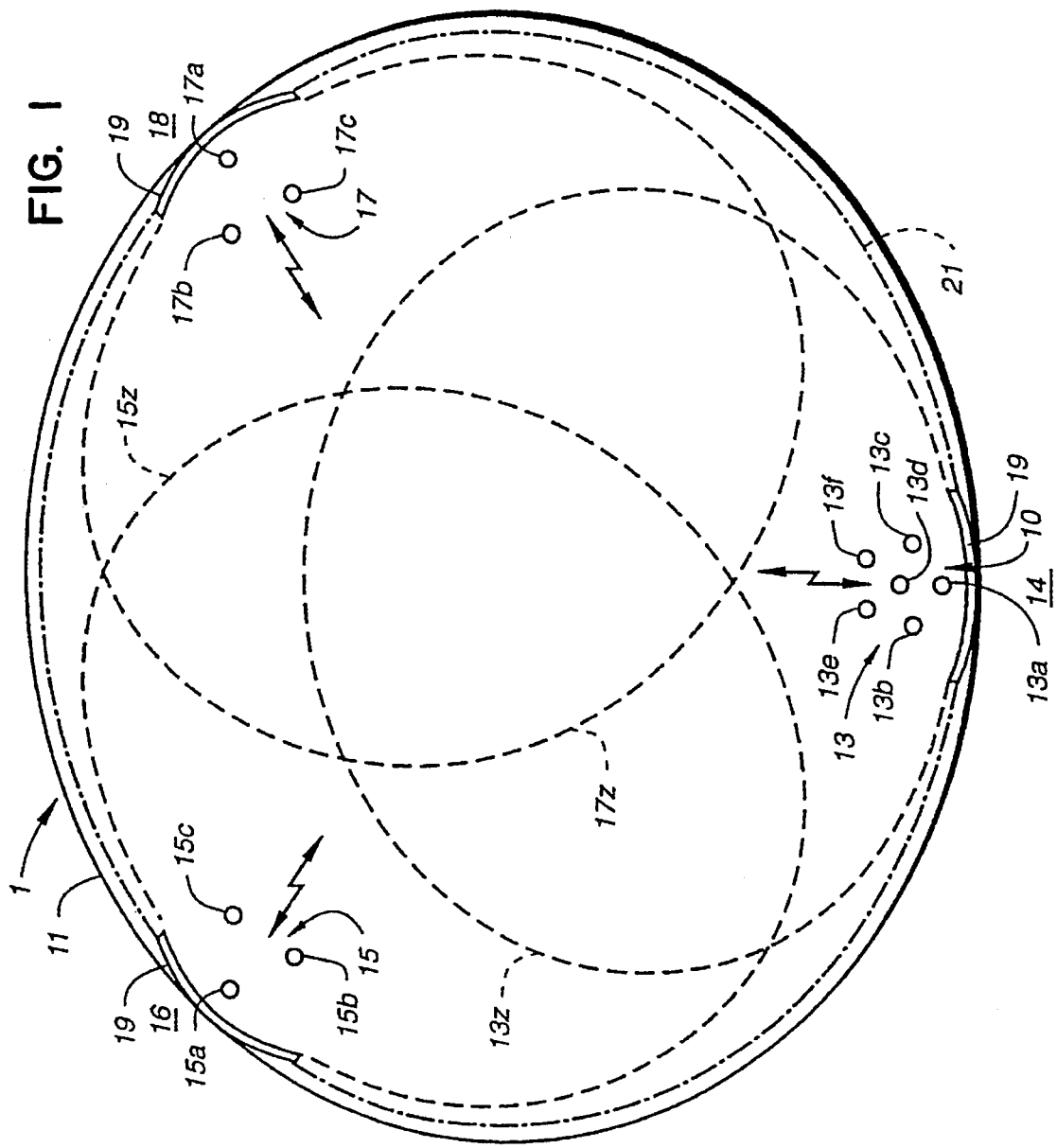
FIG. 1 is a schematic diagram illustrating a typical layout of a cell employed in the invention.

There are three main types of digital multiple access systems: digital frequency division multiple access (digital FDMA), time division multiple access (TDMA) and code division multiple access (CDMA). The present invention allows the implementation of digital FDMA, TDMA, and CDMA in a microcell. Thus, the benefits of digital multiple access communication can be realized in the microcell. In addition, the present invention relating to the digital frequency division multiple access can also be applied to an analog frequency division multiple access system by a person of ordinary skill in the art.

Frequency division multiple access, both analog and digital is a method whereby the bandwidth of a communication channel is subdivided in frequency into subchannels so that more than one user can use the communication channel simultaneously.

TDMA is a method whereby the time of operation of a communication system is divided into a plurality of time slots having predetermined lengths. The system transmits information relating to a user only during the time slots assigned to the user. The system has means to temporarily .store .information generated by the user during other times so that information is not lost during these times. Thus, more than one user is able to use the same channel in the communication system.

In a preferred cellular TDMA system, the bandwidth of a channel is 30 KHz. Three callers have access to a particular channel. Communication time is divided into time frames of 20 ms and the time frames are divided into three slots of 6.66 ms each. Each mobile unit is assigned one of the three time slots in a particular channel.

CDMA is a method whereby each user is assigned a different coding scheme instead of being assigned a different frequency channel or a different time slot. These coding schemes are orthogonal or partially correlated to each other so that it is possible to identify the user based on an analysis of the codes used in the transmission. As a result, more than one user can use the same channel.

CDMA is especially desirable if the communication channel is relatively noisy. This is because CDMA typically uses spread spectrum techniques which are known to be tolerant to noise and multipath interference. As a result, CDMA allows more users to use the noisy channel to make initial calls thereby increases the capacity of the channel.

Another advantage of CDMA is that every cell uses the same set of wide band frequencies, or channels. As a result, it is possible to have the closest co-channel separation, i.e., the ratio of the co-channel separation distance (D) and the cell radius (R) in a CDMA system could be equal to 2, whereas the ratio D/R for other communication methods is about 4.6.

A consequence of using the same set of wide band frequencies in every cell is that no frequency switching is required as mobile units move from cell to cell. Instead, the coding scheme in CDMA has a code for identifying the cells. As mobile units move from cell to cell, only the identification codes for the cells need to be changed. Such change in the identification code instead of changing frequency is referred to as "soft" handoff. As a result, the performance of the system improves.

An example of a microcell in which the system according to the present invention can be used is shown in a cell 1 of FIG. 1. The structure of cell 1 is disclosed in U.S. Pat. No. 4,932,049 issued to Lee, which is incorporated herein by reference. This structure leads to a more uniform signal coverage contour and lowered interference levels.

The outer boundary of cell 1 is delineated by the circle 11 in solid line. Although shown as a circle, cells are often represented as hexagons in designed illustrations. In reality, however, due to the shape of terrain and the presence of buildings and other structures, the actual boundary of the circle 11 may be of an irregular shape. In any case, the solid line 11 is intended to represent that location at which a mobile telephone unit passes from the influence of the illustrated cell and into the influence of an adjacent cell.

Three separate antenna sets 13, 15, and 17 are positioned within cell 1. Antenna set 13 is located at a zone site 14, whereas antenna sets 15 and 17 are located at zone site 16 and 18, respectively. One of the zone sites, for example, zone site 14, can collocate with a master site which processes the signal to and from the zone sites. Depending upon the particular conditions within the cell area, other numbers of antenna sets may be usefully employed, and it is to be understood that the use of three sets in FIG. 1 is for illustrative purposes only. Each antenna set includes a transmitting antenna 13a, 15a, and 17a, respectively. Each antenna set also includes two receiving antennas 13b and 13c, 15b and 15c, and 17b and 17c, respectively. Duplication of the receiving antennas at each zone site is for diversity use to reduce signal fading by combining the signals. The determination of the locations of zone sites and the number of zone sites in a cell can be based on the Lee's coverage prediction model published in IEEE Transactions on Vehicular Technology, February, 1988.

Each antenna set has its own zone of major influence for transmitting and receiving signals. Thus, antenna set 13 at the master site 14 has a zone indicated by the dotted line 13z. Similarly, antenna set 15 at zone site 16 has a zone of influence designated by the dotted line 15z and antenna set 17 at the zone site 18 has a zone of influence designated by the dotted line 17z. It may be seen from FIG. 1 that the zones overlap in certain areas. Directionality is provided to the antenna sets so that the zones of influence, i.e. the zones of propagation and reception of signals, are limited to be substantially within the boundaries of cell 1. Such directionality is provided by suitable means such as shown as a symbolic means 19 arranged at each antenna set or zone site. The directionality means 19 can be a reflector for each individual antenna, or any other suitable arrangement to provide the desired directionality and coverage.

The signal of the set up channels can be communicated to the mobile units inside cell 1 in two different configurations. The first configuration uses an additional antenna set in the master site, in this case, zone site 14. Thus, antenna set 13 includes a setup transmitting antenna 13d for transmitting set up signals, and duplicate setup receiving antennas 13e and 13f for receiving set up signals, as will be explained below. The set of setup antennas 13d, 13e and 13f, however, is configured to have a greater zone of influence, this being indicated by the dash-dot line 21, substantially coextensive with the limits of cell 1 delineated by circle 11. The second configuration uses the same sets of antenna 13a–c, 15a–c, and 17a–c for communicating both the voice channel and set up channel. In this configuration, no additional antenna set is required.

Figure 2:
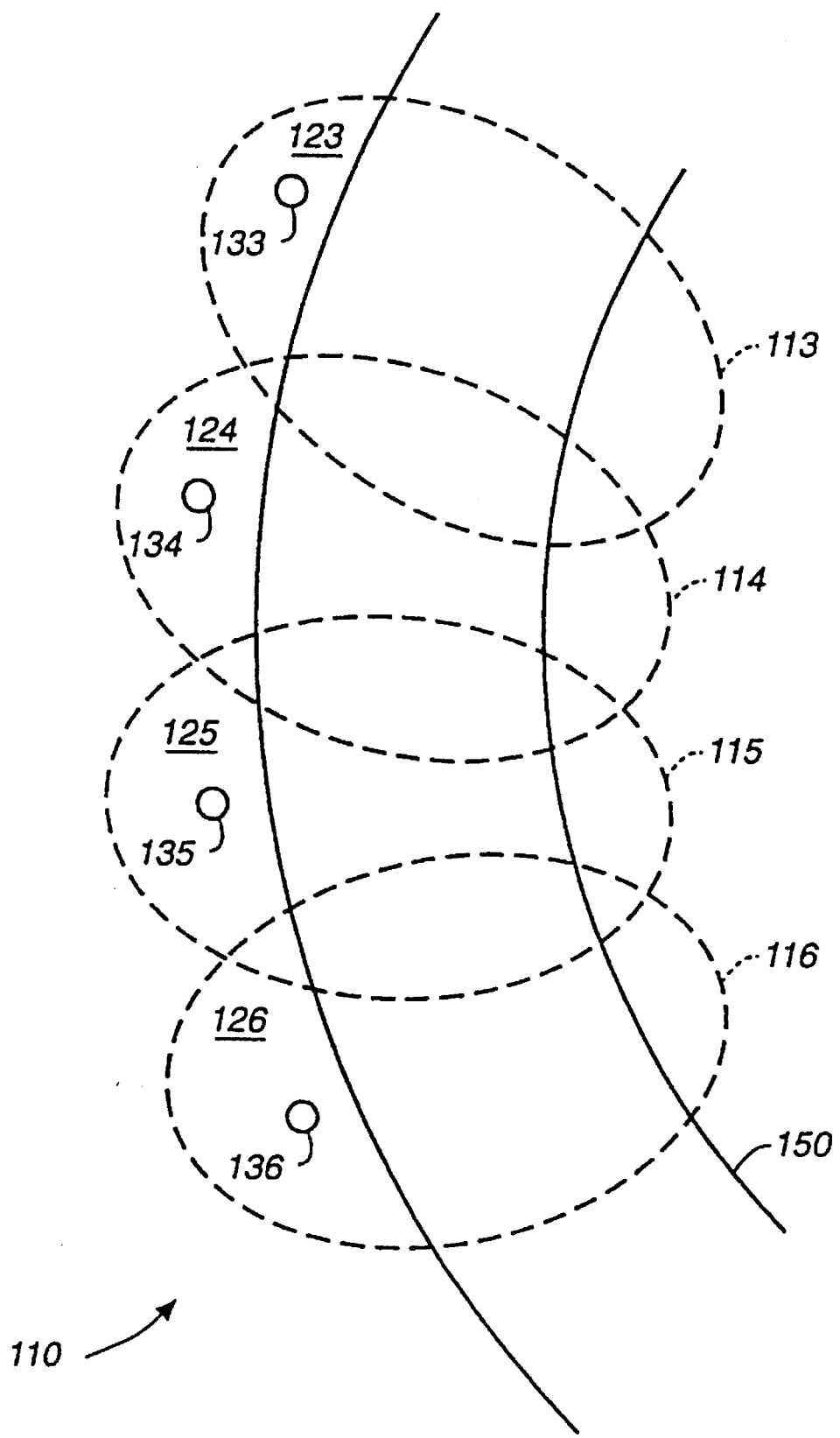
FIG. 2 is a schematic diagram illustrating another layout of a cell employed in the invention.

FIG. 2 is another example of microcell 110 in which the system according to the present invention can be used. Microcell 110 is preferably positioned along a highway 150 for providing cellular telephone services to mobile units (not shown) moving along highway 150. Microcell 110 comprises a plurality of zones, illustrated by the dotted circles 113–116. It is to be understood that the number of zones in FIG. 2 and the shape of the zones are for illustrative purposes only. Each zone comprises a zone site for housing at least one antenna set. Thus zones 113–116 comprises zone sites 123–126 and antenna sets 133–136. One of the zone sites can also be a master site.

The advantage of microcell 110 is that a long stretch of highway 150 can be covered by a set of assigned frequencies. Thus, a mobile unit can travel a long distance without the need for a handoff action. In addition, the power radiated by antennas 133–136 could be low and still cover the stretch of highway because the area of each zone is small. As a result, the microcell 110 could be implemented using low cost equipment.

Figure 3:
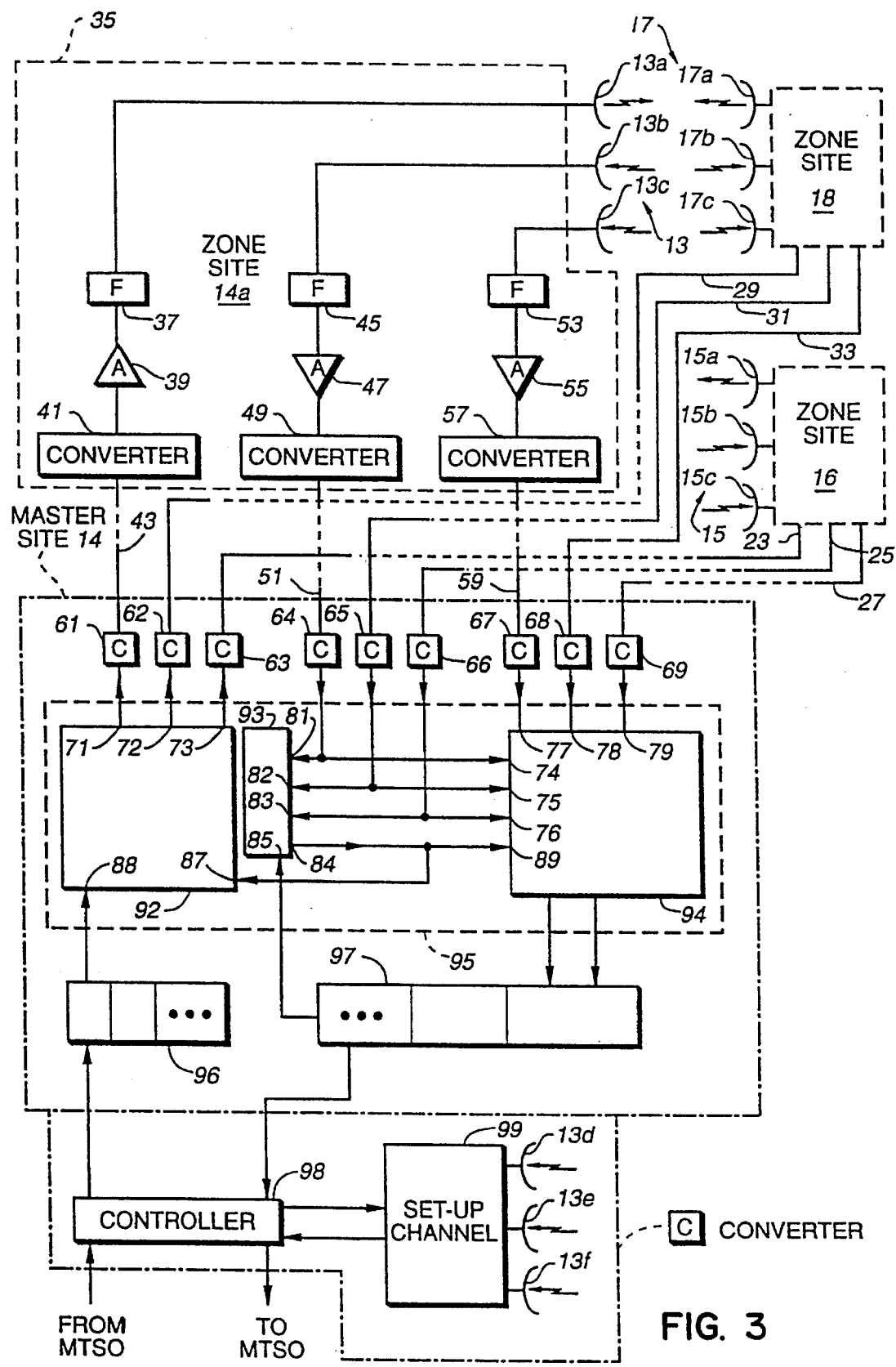
FIG. 3 is a schematic block diagram of the electronics of an embodiment of the present invention.

FIG. 3 shows a block diagram of the electronics which can be used either in a TDMA or in a digital FDMA located in the cell of FIG. 1. Two zone sites 16 and 18 are each coupled to a master site 14 and are controlled therefrom. In the illustrated embodiment, zone site 16 is connected to master site 14 via three cables 23, 25, and 27. Zone site 18 is connected to master site 14 via cables 29, 31, and 33. The specific nature of the signals assigned to the respective cables will be described below. Generally, however, cables 23 and 29 carry transmitter antenna signals whereas cables 25, 27, 31, and 33, carry receiver antenna signals. The illustrated embodiment depicts the communication between the zone sites and the master site as being via cable. It will be apparent to those skilled in the art that such cables may include, for example, T1 carrier cables, optical fibers, or the like. The cables may also be replaced by microwave channels.

The zone sites each contain a signal processing ensemble of components as shown at 35 for zone site 14a. It is understood that substantially identical signal processing ensembles are contained in zone sites 16 and 18, although such ensemble are not shown in FIG. 3 for simplicity. Signal processing ensemble 35 includes a filter 37, an amplifier 39, and a converter 41 interposed between antenna 13a and output cable 43. Similarly, filter 45, amplifier 47, and converter 49 are interposed between antenna 13b and output cable 51, and filter 53, amplifier 55, and converter 57 are interposed between antenna 13c and output cable 59. The filters, amplifiers, and converters filter, enhance, and convert signals as desired and may be of any type suitable for the stated purpose.

In FIG. 3, the three amplifiers 39, 47, and 55 enhance the UHF signals applied to their input from filters 37, 45, and 53 respectively. These UHF signals are then applied to converters 41, 49 and 57, which either up convert or amplitude modulate the frequency to an optical frequency, where optical fibers are used for the cable connections, or down convert the frequency to a base band for passing through T1 carrier cables. They may also directly convert from UHF to microwave where microwave channels are used. The filters, amplifiers and converters may be of any type suitable for the stated purpose.

Master site 14 comprises a zone selector 95, a transmitter module 96, a receiver module 97, a controller 98, and a set up channel 99. Controller 98 communicates with the MTSO. Transmitter module 96 comprises a plurality of transmitters. Each transmitter generates a signal having a frequency corresponding to the assigned frequency of a channel. The signals generated from the transmitters in transmitter module 96 is coupled to the appropriate zone site through zone selector 95 for communication with the mobile units. Zone selector 95 also receives signals from the three zone sites, and, after processing these signals in a manner described below, couple the signal to receiver module 97. Receiver module 97 comprises a plurality of receivers for recovering the signals generated by mobile units in the cell. Each receiver is a two-branch diversity receiver, well known in the art, which comprises two inputs, each input accepting a signal from one of the two receiving antenna in the zone site. Each receiver is tuned to a frequency corresponding to the assigned frequency of a channel. The recovered signals are coupled to controller 98.

Figure 4:
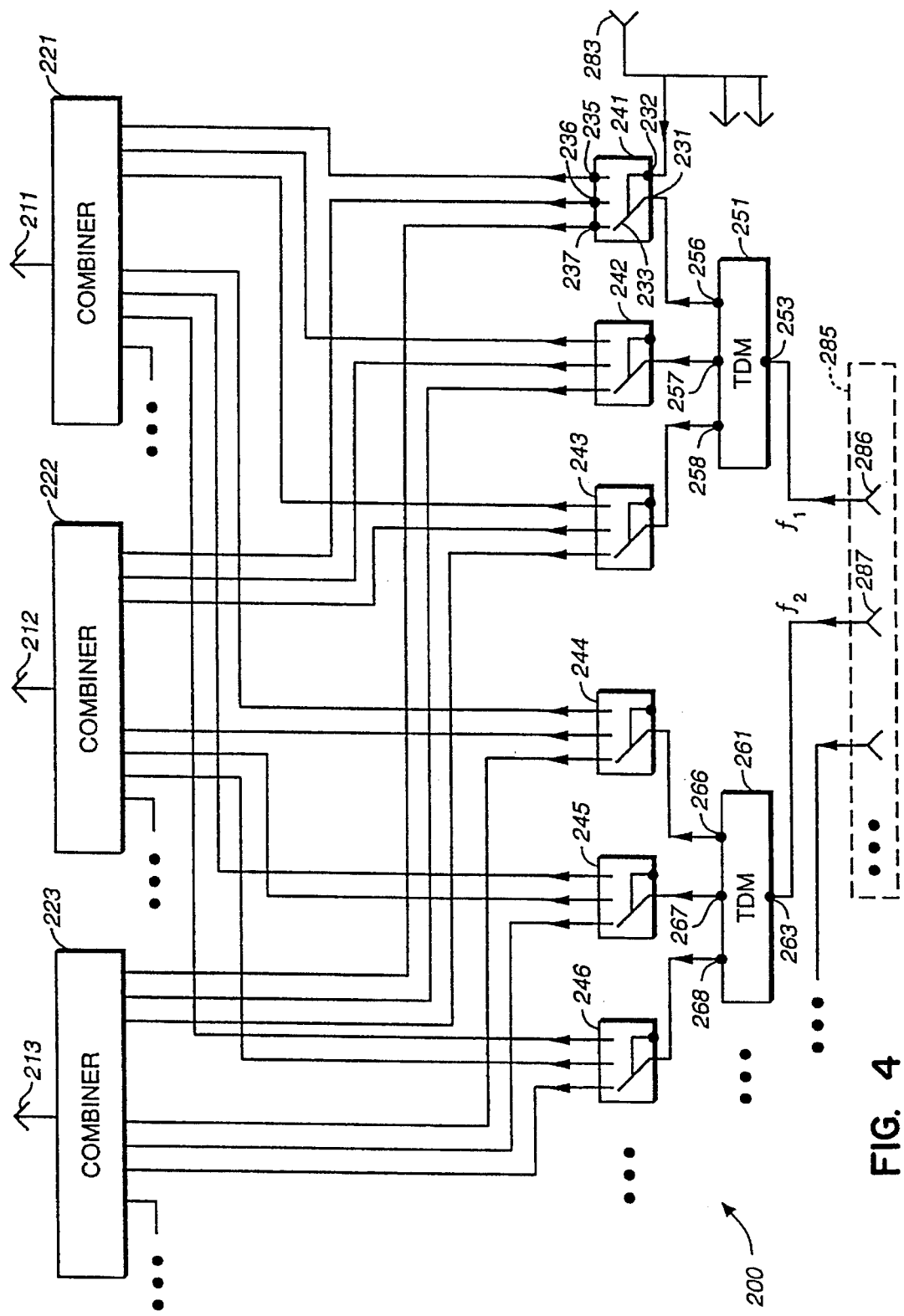
FIG. 4 is a schematic block diagram of a zone select transmitter system according to the present invention.
Figure 5:
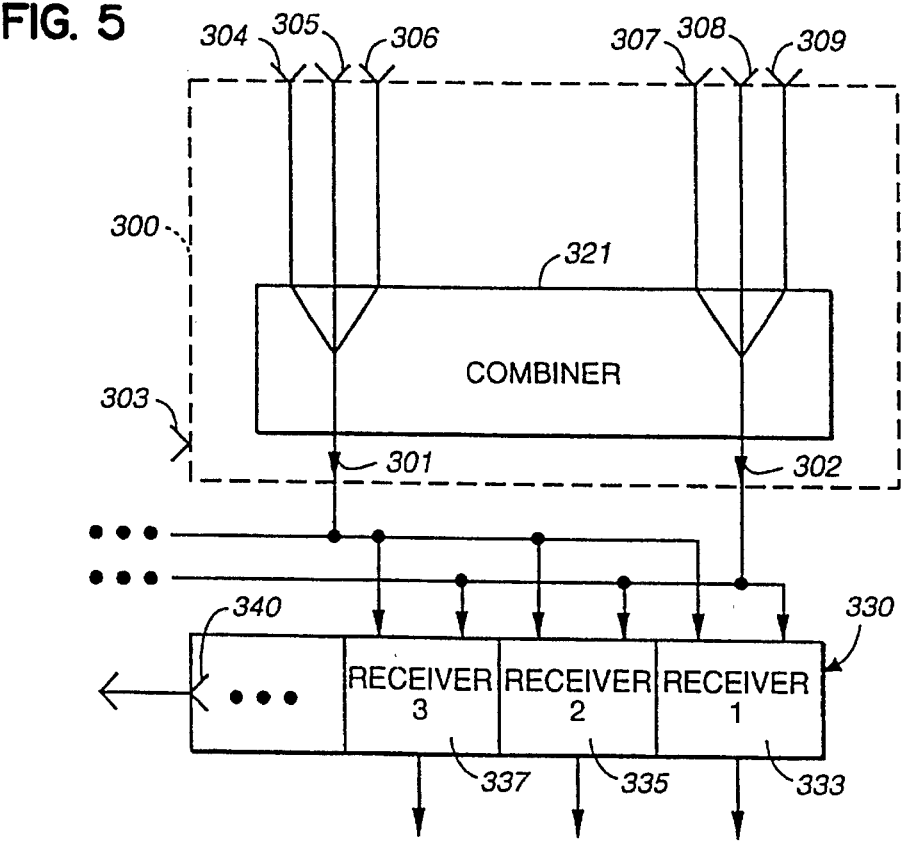
FIG. 5 is a schematic block diagram of an embodiment of a zone site selector according to the present invention.
Figure 7:
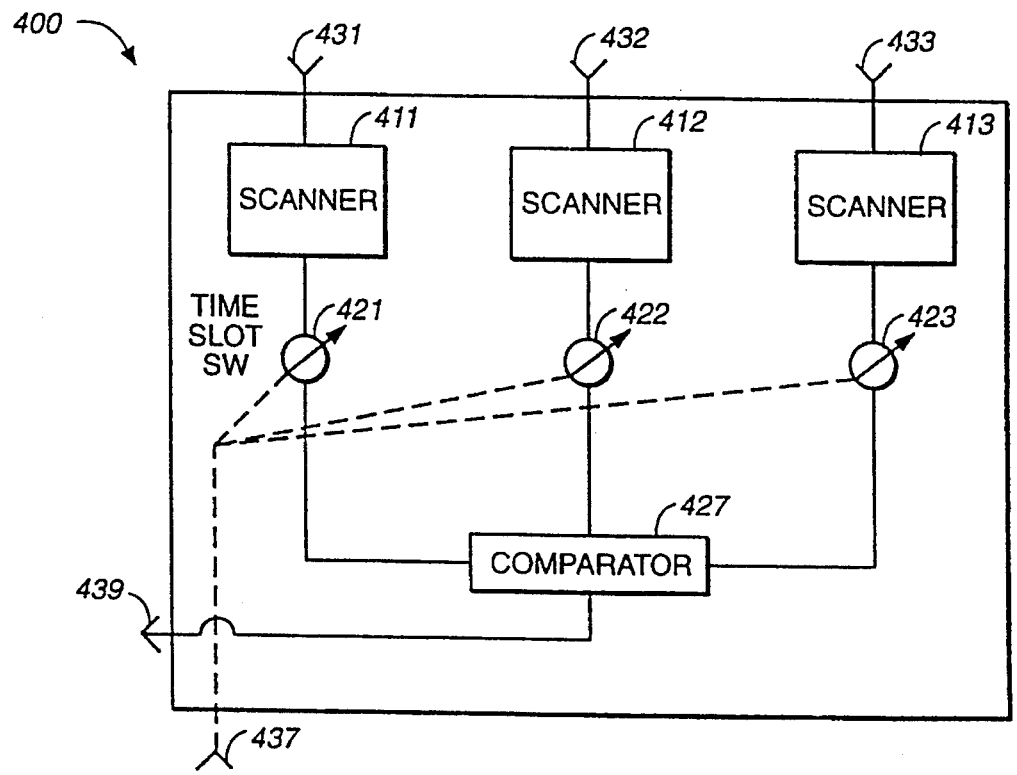
FIG. 7 is a schematic block diagram of a 10 scanning receiver system according to the present invention.
Figure 6:
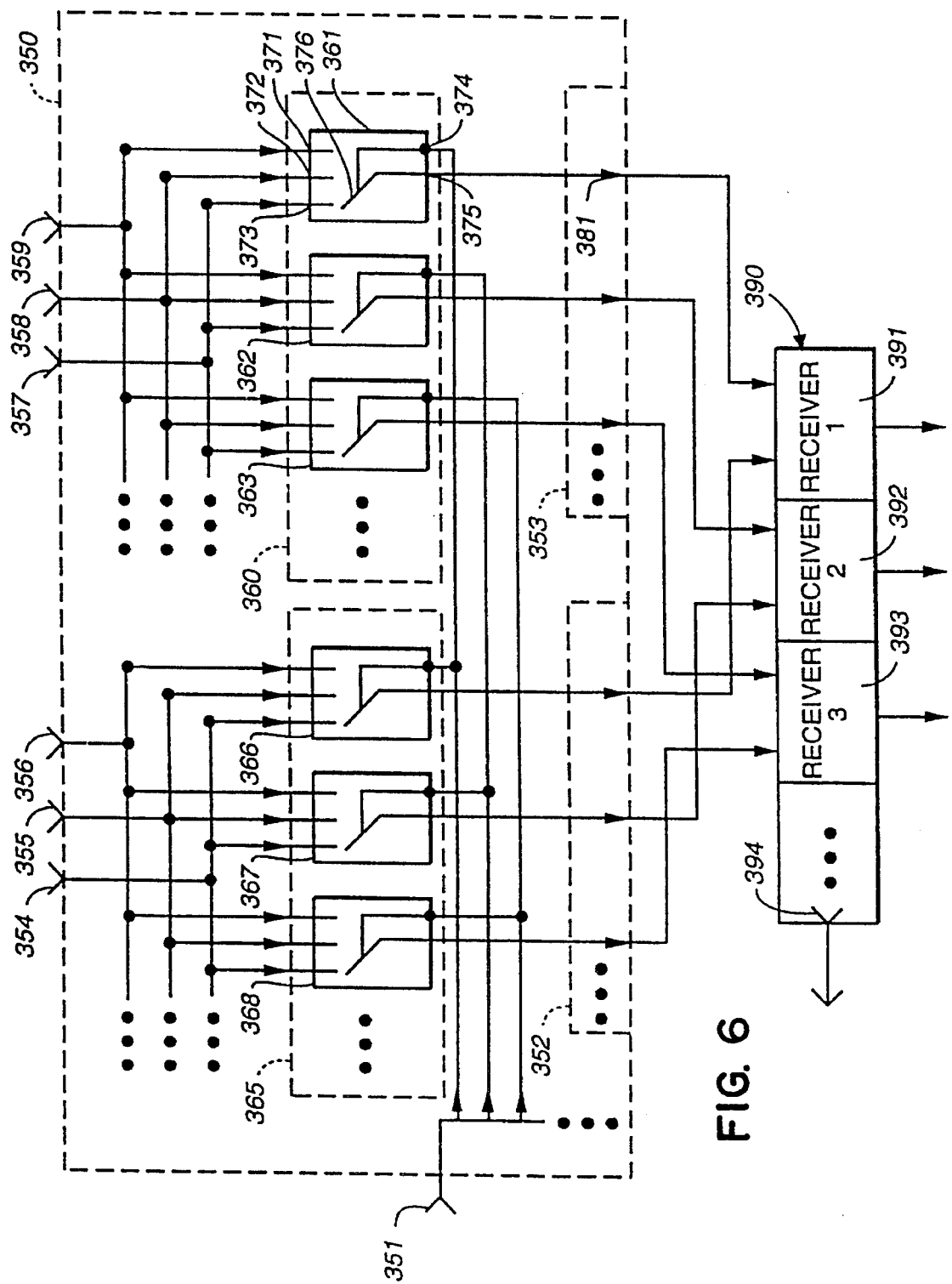
FIG. 6 is a schematic block diagram of another embodiment of a zone site selector according to the present invention.

Zone selector 95 comprises a zone switch 92, a zone switch/combiner 94, and a zone scanner 93. Zone switch 92 receives signal from transmitter module 96 and directs the signal to the appropriate zone site for communication with the mobile units. An exemplary implementation of zone switch 92 is shown at FIG. 4. The selection of the appropriate zone site is determined by a selection signal generated by zone scanner 93. An exemplary implementation of zone scanner 93 is shown at FIG. 7. Zone switch/combiner 94 receives signals from the zone sites, and, depending on the mode of operations, described below, either combines the signals from the three zone sites or selects a signal from one zone before coupling the resulting signal to receiver module 97. Exemplary implementations of zone switch/combiner 94 are shown at FIGS. 5 and 6.

At master site 14, the output ports 71–73 of zone switch 92 go through converters 61–63, respectively, and then coupled to zone sites 14a, 18 and 16, respectively, through cable connectors 43, 29, and 23, respectively. The selection of the appropriate zone site is determined by a selection signal generated by a zone scanner which is input to zone switch 92 through an input port 87. Zone switch 92 also has an input port 88 for inputting a set of transmitting signals generated by transmitter module 96.

Zone scanner 93 comprises three input ports 81–83 for coupling signals from the three zone sites via converters 64–66, respectively. The strength of these signals are compared to determine the zone site which gives rise to the strongest signal. Alternatively, the zone site can also be selected based on the supervisory audio tone (SAT) signal. Zone scanner 93 also comprises an input port 85 for accepting a time division clock signal from receiver module 97 for separating the appropriate time slot. The selection signal generated by zone scanner 93 is sent to an output port 84 for coupling to zone switch/combiner 94 and zone switch 92.

The signal received from the three zone sites, after going through cable connectors 25, 27, 31, 33, 51, 59, and converters 64–69, terminates at the input ports 74–79 of zone switch/combiner 94. If zone switch/combiner 94 operates in a zone switching mode, a selection signal is coupled to an input port 89. The selection signal selects one of the signals from one of the three zone sites for coupling to the output ports 90, 91. If zone switch/combiner 94 operates in a combining mode such that the signals from all the zones are combined, the selection signal is not used. Zone switch/combiner 94 generates two sets of output signals, one at an output port 90 and the other at an output port 91. Each member of each set of output signals is coupled to a corresponding input terminal of a two-branch diversity receiver in receiver module 97.

It can be understood by a person of ordinary skill in the art that if master site 14 is co-located with one of the zone sites, say zone site 14a, no converter is required for communicating between master site 14 and the co-located zone site 14a. In this case, converters 41, 61, 49, 64, 57, and 67 are not needed.

Controller 98 measures the signal strength of a channel requested by the MTSO. If the initial call is in this particular cell, or if the call is handed off to this particular cell through the controller, the controller initiates one of the transmitters in transmitter module 96 to transmit at a particular frequency assigned by a MTSO to that call. The signal is then sent to a proper zone through zone switch 92. If during the call, the signal strength received at controller 98 is below a preselected level, the controller initiates a handoff process from the MTSO to handoff the call to another cell.

Figure 8:
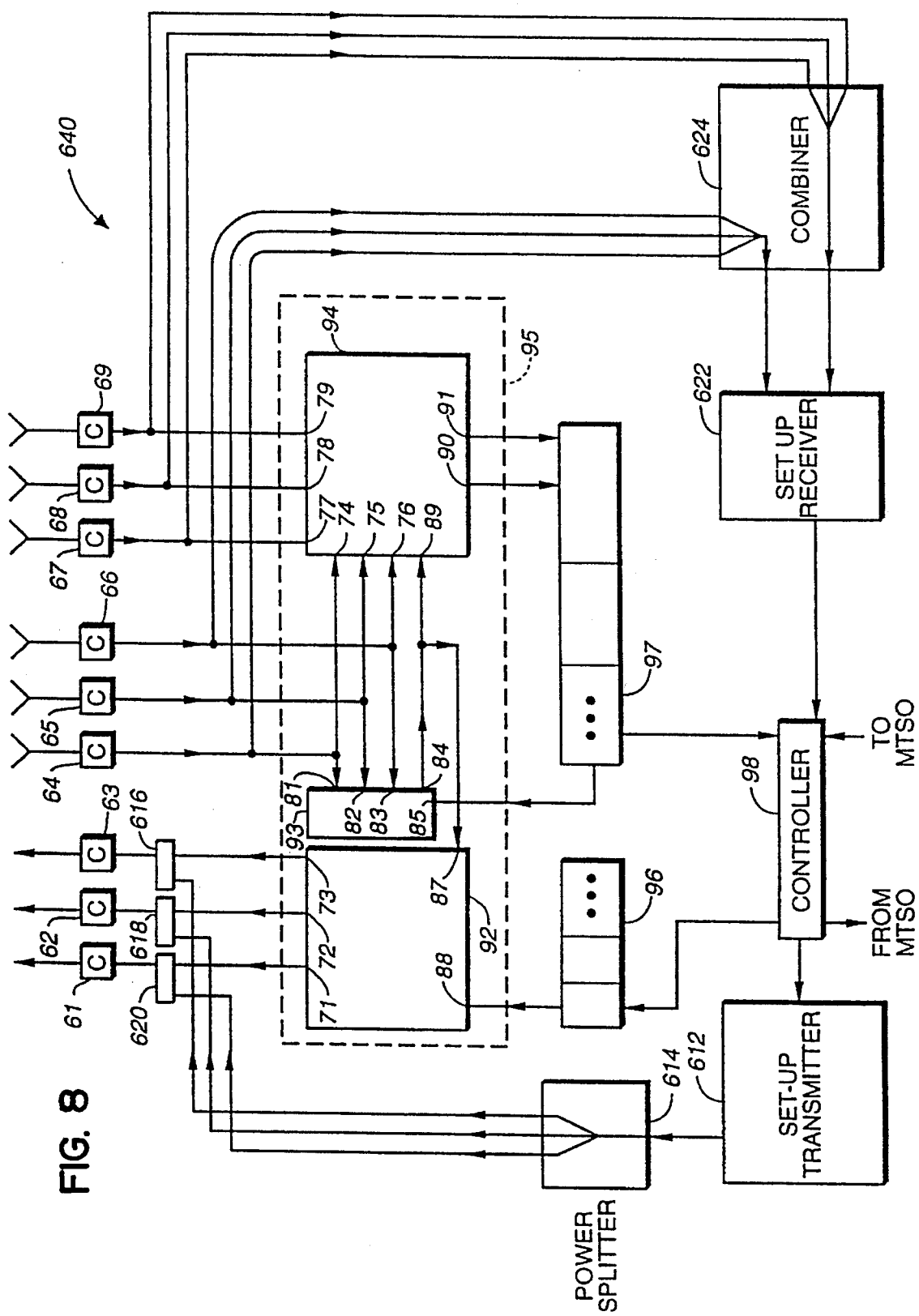
FIG. 8 is a schematic of a master site according to the present invention wherein set up channel is transmitted and received through zone sites.

In FIG. 3, controller 98 is connected to a set up channel 99 which transmits and receives signals on the three control antennas 13*d*, 13*e*, and 13*f*. The set up channel assigned in each cell can cover the entire zone of influence 21, shown in FIG. 1, which is coextensive with cell 1 in FIG. 1. However, it is also possible to transmit the set up channel 99 to each zone site so that no setup channel antennas are needed. In this case, all zone sites transmit and receive the setup channel inside its zone of influence. An exemplary setup channel which does not use setup channel antennas is shown in FIG. 8.

In operation of the system above described, a mobile unit which is operating on an assigned frequency $f_1$ in the cell will typically be moving within the cell. All zone sites within the cell will receive signal levels (strengths), but only that zone site at which the received signal level is the strongest will transmit and receive signals to the mobile unit during a call. The transmitters in the other zone sites do not transmit to the mobile unit. When the mobile unit moves such that the received signal strength at a zone site other than the one that is currently transmitting becomes strongest, the system operates to turn off the transmitter at the weaker zone site and turn on the transmitter at the zone site at which the stronger signal level is being received. The two-diversity antenna signal at each zone are also selected from the proper zone site to receive the call. The operating frequency, however, remains unchanged at $f_1$. Thus, no handoff has occurred in the traditional sense and the MTSO is not involved. As a result, no additional handoff load is added to the MTSO switching equipment. An alternative way is to combine the two diversity antenna signals from all zones, as described below.

As was noted above, the block diagram shown in FIG. 3 can be used both in digital FDMA and TDMA. In a TDMA scheme, a plurality of time division multiplexers and an associated synchronization clock is used, as explained below. In a digital FDMA scheme, it is not necessary to use the time division multiplexers and the associated clock.

FIG. 4 shows a block diagram of an exemplary zone switch, shown as numeral reference 92 in FIG. 3, according to the present invention. Zone switch 200 comprises two input port 283, 285 and three output ports 211–213 which correspond to ports 87, 88, and 71–73, respectively, of zone switch 92 in FIG. 3. Thus, signals from a transmitter module, shown as 96 in FIG. 3, is coupled to input port 285 of zone switch 200. These signals are directed by zone switch 200 to the three zone sites 14*a*, 18, and 16 through output ports 211–213.

As was noted above, transmitter module 96 comprises a plurality of transmitters, each generating a different signal. Thus, Input port 285 further comprises a plurality of input terminals, shown as 286 and 287 in FIG. 4. Terminal 286 couples a signal having a frequency of $f_1$ into zone switch 200 and terminal 287 couples a signal having a frequency of $f_2$ into transmitting zone switch 200.

Zone switch 200 further comprises a plurality of time division multiplexers, two of them, 251 and 261 are shown at FIG. 4 for illustrative purpose. In general, the number of time division multiplexers is the same as the number of frequency channels assigned to the cell. Zone switch 200 also comprises a plurality of channel zone switches, six of them, 241–246, are shown at FIG. 4. In general, the number of zone switches is equal to the product of the number of time slots and the number of time division multiplexers. Zone switch 200 further comprises three combiners 221–223, one associated with each zone site, for combining the signals from the channel zone switches for sending to the three zone sites.

A time division multiplexer (TDM) is a device, well known in the art, for dividing time intervals into time slots. In FIG. 4, TDM 251 and 261 divide each time interval into three time slots. Preferably each time slot is 6.66 ms long in a 20 ms time interval. It may be understood that a TDM can divide time intervals into any suitable number of time slots, and the choice of the number of divisions in TDM 251 and 261 are for illustrative purposes only.

TDM 251 comprises an input port 253 for accepting signals having a frequency of $f_1$, generated by a transmitter of transmitter module 96, shown in FIG. 3. The time interval for transmitting the signal having frequency $f_1$ is divided into three time slots. The signals of the time slots are coupled to output ports 256–257. Each of these signals is eventually directed to a zone site for communicating with a mobile unit. Since different time slots can be directed to different zone sites, it is possible that three mobile units in three zone sites communicate with master site 14 using the same frequency channel.

Similarly, TDM 261 comprises an input port 263 and three output ports 266–268. Ports 263 and 266–268 correspond to ports 253 and 256–258, respectively, of TDM 251. TDM 261 functions in a similar way as TDM 251. All the output signals from TDM 261 have frequency $f_2$ since the input signal to TDM 261 has a frequency of $f_2$. Again, signals having frequency $f_2$ in the "three time" slots can be directed to the same or different zone sites.

Each of the output ports from the TDMs is coupled to a channel zone switch for directing the output of a communication channel from the TDMs to the appropriate zone site. Thus, output ports 256–258 and 266–268 are coupled to channel zone switches 241–246, respectively. The construction of all the channel zone switches are substantially the same. Thus, only one channel zone switch, 241, is described in detail.

Channel zone switch 241 comprises an input port 231 for accepting signals from TDM 251. Channel zone switch 241 also comprises three output ports 235–237 coupled to combiners 221–223, respectively, for directing signals to one of the three combiners. Channel zone switch 241 further comprises a switch 233 for selectively coupling the input port 231 to one of the three output ports 235–237. The coupling is controlled by a selection signal at a control port 232. Control port 232 is coupled to input port 283. As was noted above, input port 283 Corresponds to port 87 in FIG. 3 which is coupled to zone scanner 93. Depending on the status of the signal at input port 232, the signals from output port 256 of TDM 251 could be sent to one of the three zone sites.

Similarly, each channel zone switch has three output ports for coupling to the three combiners. Again, depending on the status of the control port, the outputs of the channel zone switch is coupled to one of the three combiners. Each of the combiners 221–223 combines all the signals coupled thereto and sends the signals out to the zone sites through output ports 211–213, respectively.

As was noted above, a typical TDMA system divides a time interval of 20 ms into time slots. If quadrature phase shift-keying modulation is used, a total of 486 symbols can be transmitted within the 20 ms time interval, i.e., the time duration for each symbol is 41 microseconds. In order to ensure that the last symbol of one slot and the first symbol of the next slot are correctly received, the rate of switching should be faster than the time duration for a single symbol, i.e., 41 microseconds. In order to prevent undesirable effects resulting from switching transients, a TDM switch which has a switching rate substantially faster than 41 microseconds should be used. Examples of such TDM switches are part numbers 54F/74F 151A manufactured by National Semiconductor and 10G050A manufactured by GBL.

It should be noted that the block diagram shown in FIG. 4 can also be used in a digital FDMA scheme if the TDMs are removed from the block diagram. In this case, the signals from the transmitters in transmitter module 96, shown in FIG. 3, are coupled directly to the channel zone switches, and the number of channel zone switches are the same as the number of transmitters instead of three times the number of transmitters if the TDMs are included. Thus, terminal 286 couples a signal having frequency $f_1$ to one of the three channel zone switches 241–243. Similarly, terminal 287 couples a signal having frequency $f_2$ to one of the three channel zone switches 244–246.

FIG. 5 is a block diagram of a zone switch/combiner 300 according to the present invention. In this embodiment, zone switch/combiner 300 operates as a combiner and will be referred to as zone combiner in the following description of FIG. 5. The block diagram in FIG. 5 also includes a receiver module 330. Zone combiner 300 and receiver module 330 correspond to zone switch/combiner 94 and receiver module 97 in FIG. 3.

Zone combiner 300 comprises seven input ports 303, 304–309, and two output ports 301, 302. Input ports 303, 304–309 and output ports 301, 302 correspond to input ports 89, 74–79 and output ports 90, 91, respectively, of FIG. 3. Thus, the signals at input ports 304–309 are signals from the zone sites.

The signals from input ports 304–306 are combined by combiner 321 and coupled to output port 301. Since input ports 304–306 are coupled to the zone sites, it means that all three signals from all the three zone sites are combined together by combiner 321. Similarly, the signals from input ports 307–309 are combined by combiner 321 and then coupled to output port 302. Again, input ports 307–309 are coupled to the three zone sites, thus, the three signals from the three zone sites are combined together by combiner 321. The signals at output ports 301 and 302 are coupled to receiver modules 330 in an arrangement described below. Since there is no need to select the zone sites in this embodiment, the select signal present at port 303 is not used.

Receiver module 330 comprises a plurality of two-branch diversity receivers, only three of these receivers, 333, 335, 337, are shown in FIG. 5. These receivers 333,335, 337 are TDM receivers and could recover individual signals sent by the mobile units. Each receiver in module 311 is tuned to a frequency corresponding to the frequency generated by a corresponding transmitter in transmitter module 96, shown in FIG. 3.

Each receiver in receiver module 330 comprises two input ports. One of the input ports is coupled to port 301 and the other input port is coupled to port 302. The recovered signal from each receiver is sent to controller 98, shown in FIG. 3. It is well known in the art that the two-branch diversity receiver arrangement enhances the quality of the received signal.

Since all the receivers in receiver module 330 are TDM receivers, all the receivers share a common clock (not shown) which can be used for synchronization with the time slots of the TDMs in zone switch 200, shown in FIG. 4. The common clock signal is sent out of receiver module 330 through an output port 340. As was noted above, this clock signal is coupled to zone scanner 93, shown in FIG. 3, for synchronization.

It should be noted that if the block diagram of FIG. 5 is used in a digital FDMA scheme, no synchronization clock is needed. Consequently, port 341 is not needed.

Zone combiner 300, shown in FIG. 5, is preferably used if the transmission rate is low, typically less than 10 kilobits per second, or the distance between the zone sites and the master is short, typically less than one half of a kilometer. Otherwise, another implementation of zone site selector, shown at FIG. 6, should preferably be used.

Even though zone combiner 300 is described as part of a TDMA and a digital FDMA scheme, it should be noted that zone combiner 300 can also be used in an analog multiple access system and in a portable telephone system. One of the advantages in using zone combiner 300 in an analog system is that the power delivered to the receivers in receiving module 330 is increased because all the power from the three zone sites are utilized. Another advantage is that temporal loss of received signal from one zone would have less effect on the quality of the signal because signals from the other zones could compensate for such loss.

FIG. 6 is a block diagram of a receiver module 390 and a zone switch/combiner 350 which is suitable for high transmission rates or in situations where the distance between the zone sites and the master site is long. In this embodiment, zone switch/combiner 350 operates as a zone switch, and will be referred to as a zone switch for receiving in the description of FIG. 6. Receiver module 390 is similar to receiver module 330 of FIG. 5 and comprises a plurality of two branch diversity receivers 391–393 for recovering signals transmitted by mobile units. Receiver module 390 also comprises an output port 394 for sending a clock signal to zone scanner 93, shown in FIG. 3, for synchronization.

Zone switch 350 comprises two sets of channel zone switches 360 and 365. Zone switch 350 further comprises two output ports 352, 353, and seven input ports 351, 354–357 which correspond to ports 90, 91, 89, and 74–79, respectively, of zone switch/combiner 94, shown in FIG. 3. Input signals from input ports 357–359 are coupled to the first set of channel zone switches 360. Input signals from input ports 354–356 are coupled to the second set of channel zone switches 365.

Each set of channel zone switches 360, 365 has a plurality of channel zone switches, 361–363 and 366–368. The number of channel zone switches in each set is the same as the number of channels in receiving module 390. Each channel zone switch selects one of the zone sites in response to a control signal at input port 351. Since input port 351 corresponds to port 89 in FIG. 3, the control signal is a signal from zone scanner 93, shown in FIG. 3.

The channel zone switches in zone switch 350 for receiving is substantially the same as the channel zone switches in zone switch 200 for transmitting, shown in FIG. 4, except that the channel zone switches in receiving zone switch 350 have three input ports and one output port instead of three output ports and one input port. Again, a selection signal is used to determine the coupling of the output port to one of three input ports. Since the operations of all the channel zone switches are the same, only one channel zone switch, 361, is described in detail.

Channel zone switch 361 comprises three input ports 371–373 for accepting signals from input ports 359, 358, and 357, respectively. Channel zone switch 361 also comprises an output port 375 for coupling signal to a terminal 381 inside output port 353, preferably an outlet box, of receiving zone switch 350. Channel zone switch 361 further comprises a switch 376 for selectively coupling the output port 375 to one of the three input ports 371–373. The coupling is controlled by a selection signal at a control port 374. Control port 374 is coupled to input port 351. As was noted above, input port 351 corresponds to port 89 in FIG. 3 which is coupled to zone scanner 93. Depending on the status of the signal at input port 375, the signals from one of the input ports 371–373 of channel zone switch 361 could be sent to output port 375.

The output signal from channel zone switch 361 is coupled to an input port of receiver 391. This signal comprises one branch of a two-branch diversity signal. Similarly, the output from channel zone switch 366 is coupled to another input port of receiver 391. This signal comprises a second branch of a two-branch diversity signal. Receiver 391 recovers the signal transmitted by a mobile unit and sends this signal to controller 98, shown in FIG. 3.

Similarly, the output signals from channel zone switches 362, 367 are coupled to receiver 392 and the output signals from channel zone switches 363, 368 are coupled to receiver 393. The signals recovered by receivers 392, 393 are coupled to controller 98.

It should be noted that if the block diagram of FIG. 6 is used in a digital FDMA system, no synchronization clock is needed. Consequently, port 341 is not needed.

FIG. 7 is an exemplary implementation of a zone scanner 400. Scanning receiver 400 comprises three frequency scanners 411–413, three time slot switches 421– 423, and a comparator 427. Zone scanner 400 further comprises four input ports 437, 431–433 and an output port 439. Ports 431–433, 437, and 439 correspond to ports 81–83, 85, and 84, respectively, of zone scanner. 93, shown in FIG. 3.

Signals from zone sites 14a, 18, and 16 are coupled to frequency scanners 411–413 through input ports 431–433, respectively. Frequency scanners 431–433 scan a predetermined number of frequencies from zone sites 14a, 18, and 16, respectively. Time slot switches 421–423 selectively couple one of the three scanners 411–413 to comparator 427 at any given time. The timing for coupling one of the three scanners 411–413 is controlled by a clock signal input from port 437.

Comparator 427 stores and compares the average signal strength of the signals from the three zone sites. As a result, it is possible to determine the zone site which gives rise to the strongest signal received at the master site. This information is coupled to output port 439 as a selection signal for controlling the zone switches. Comparator 427 preferably includes hysteresis means for reducing the ping pong effects resulting from instantaneous signal fluctuations. Comparator can also be used to compare the strongest supervisory-audio-tone signals among the three zones.

It should be noted that if the block diagram of FIG. 7 is used in a digital FDMA scheme, no synchronization clock and time slot switch is needed. Consequently, time slot switches 421–423 and port 431 are not needed.

FIG. 8 is a schematic block diagram of a master site 640 wherein the setup channel is transmitted and received by the three zone sites instead of using setup channel antennas. The zone switch/combiner 94, zone switch 92 for transmitting, zone scanner 93, controller 98, and converters 61–69 in FIG. 8 function the same and share the same numeral references as the corresponding elements of FIG. 3. Consequently, these elements and their connections are not described here.

Controller 98 is coupled to a set up transmitter 612 which is in turn coupled to a power splitter 614. Power splitter 614 splits the signal generated by set up transmitter 612 into three substantially identical signals. Each of the three signals is coupled to a corresponding combiner 616, 618, 620. Signals from the output ports 71–73 of zone switch 92 for transmitters are also coupled to combiners 620, 618, and 616, respectively. The combined signals from combiners 620, 618, and 616 are coupled to converters 61–63 for sending to the corresponding zone sites. A power splitter is used in FIG. 8 because the location of the mobile unit is not known during set up operations.

Signals from converters 64–69 are coupled to a combiner 624 in addition to zone switch/combiner 94. Combiner 624 combines the signals from converters 64–66 into one signal and couples the combined signal to one input port of a two-branch diversity set up receiver 622. Combiner 624 also combines the signals from converter 67–69 into one signal and couples the combined signal to a second input port of receiver 622. Receiver 622 recovers the set up channel transmitted by a mobile unit and couples the signal to controller 98.

Zone switch/combiner 94 can either be of a type comprising a combiner, shown in FIG. 5, or of a type comprising channel zone switches, shown in FIG. 6. If zone switch/combiner 94 comprises a combiner, this combiner can be physically combined with combiner 624.

It should be noted that the arrangement in FIG. 8 can be used in analog frequency division multiple access, digital frequency division multiple access, TDMA, and CDMA.

Figure 9:
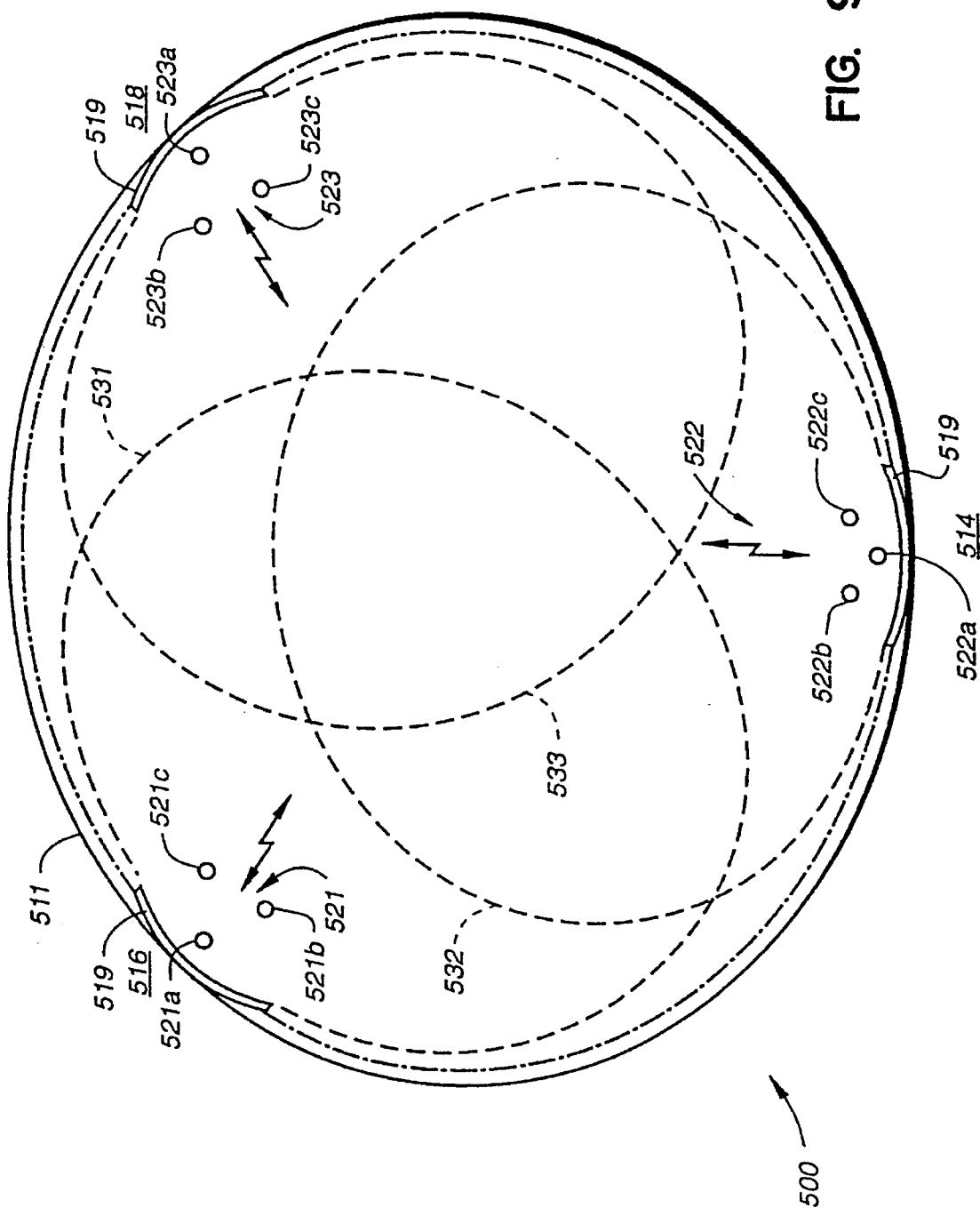
FIG. 9 is a schematic diagram illustrating a typical layout of a cell in a code division multiple access (CDMA) system according to the present invention.

FIG. 9 is a schematic diagram illustrating a typical layout of a cell 500 utilized in a CDMA system according to the present invention. The outer boundary of cell 500 is delineated by a circle 511 in solid line. The circle is used for illustrative purposes only and the actual boundary of cell 500 may have an irregular shape. Three separate antenna sets 521–523, are each positioned in a zone site 516, 514, and 518, respectively, within cell 500. A master site is co-located with a zone site, in this case, zone site 514. Depending upon the particular conditions within the cell area, other members of antenna sets may be usefully employed.

Each antenna set includes a transmitting antenna 521a, 522a, and 523a. Each antenna set also includes two receiving antennas 521b and 521c, 522b and 522c, and 523b and 523c, respectively. Duplication of the receiving antenna at each sub-site is for diversity use to reduce signal fading by combining the signals. Directionality of the antenna is provided by suitable means, shown as a symbolic means 519, for each set of antennas. Each antenna set has its own zone of major influence for transmitting and receiving signals. Thus antenna set 521–523 has zones of influence designated by dotted lines 531–533, respectively. In contrast to the antenna arrangement shown in FIG. 1, there is no separate setup channel antenna.

In the CDMA system according to the present invention, the three zone sites are transmitting and receiving signals continuously. Thus, cell 500 becomes a three-zone microcell. Since the radius of each microcell is about half that of the cell, the power level required is reduced by a factor of four. Consequently, the amount of interference to neighboring cells are reduced substantially thereby resulting in higher quality. In addition, the reduced power level also allows the use of low cost equipment.

Figure 10:
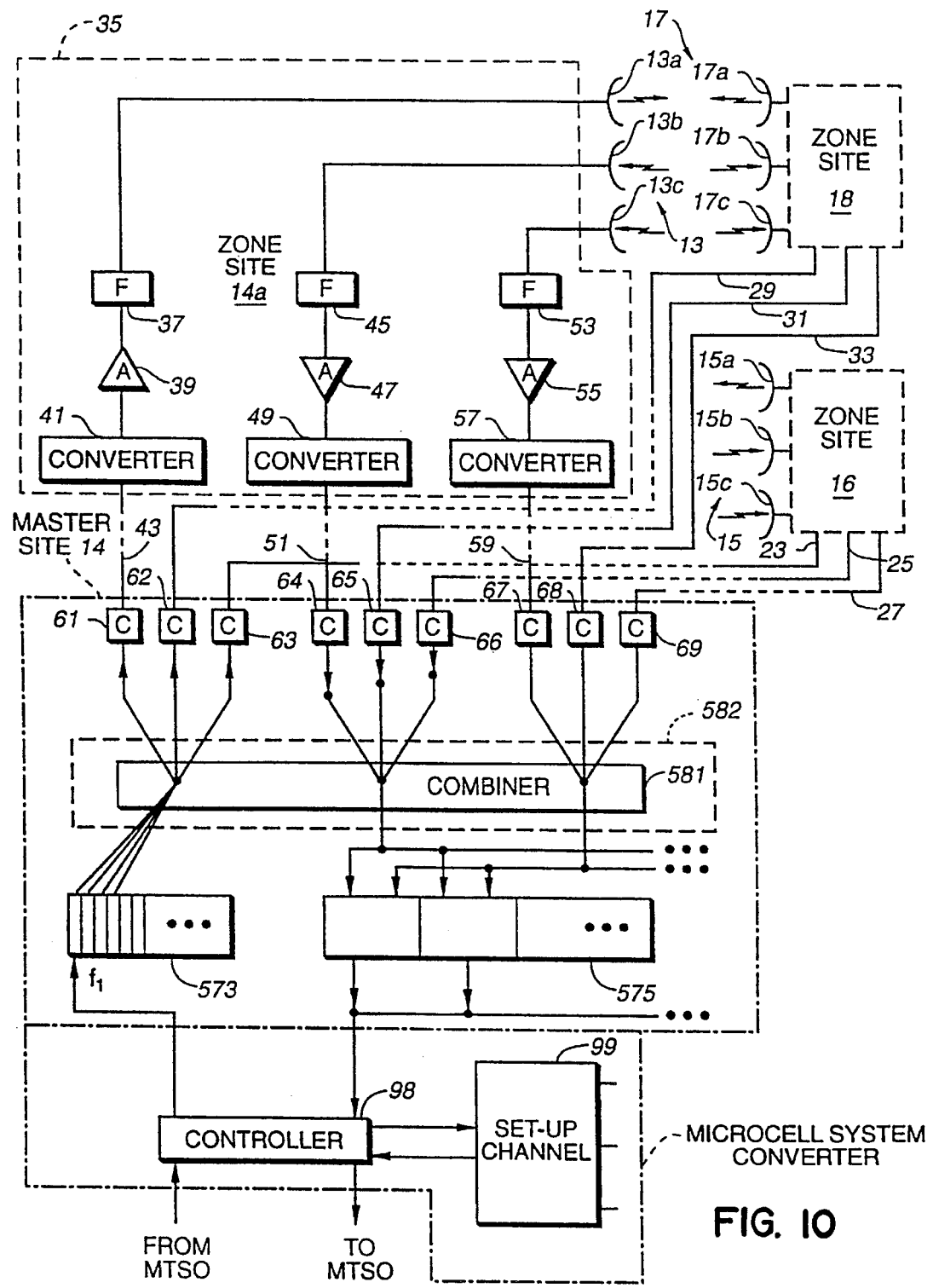
FIG. 10 is a schematic block diagram of the electronics in a CDMA system according to the present invention.

FIG. 10 is a schematic block diagram of the electronics of a CDMA system according to the present invention. The functions of the components in FIG. 10 are substantially the same as the functions of the components in FIG. 3, except that zone selector 95, which comprises zone switch 92, zone scanner 93, and zone switch/combiner 94, is replaced by a zone selector 582, which comprises a combiner 581. The components having the same functions in FIGS. 3 and 8 are shown with the same numeral references, and the functions and connections of these components are not described here.

The CDMA system, shown in FIG. 10, comprises a transmitter module 573 which includes at least one wideband (spread spectrum) transmitter for generating signals having the appropriate codes at the initiation of a signal from a controller 98. The signal generated by module 573 are coupled to combiner 581. The combined signal is sent to all the zone sites for the antenna set inside the zone site. Unlike the TDMA system, it is not necessary to divide time intervals into time slots and select the appropriate zone sites.

Signals received by all the zone sites are also combined by combiner 581. Thus, signals received by converters 64–65 are combined by combiner 581. The combined signal is sent to one input port of all the two-branch diversity receivers in a receiver module 575. Similarly, signals received by converters 67–69 are combined by combiner 581 and sent to a second input port of all the two-branch diversity receivers in receiver module 575. Receiver module 575 comprises at least one CDMA receiver, well known in the art, for recovering the signals sent by the mobile units to the master site 514. After the signals coupled to the receivers are diversity combined, they are coupled to controller 98.

Figure 11:
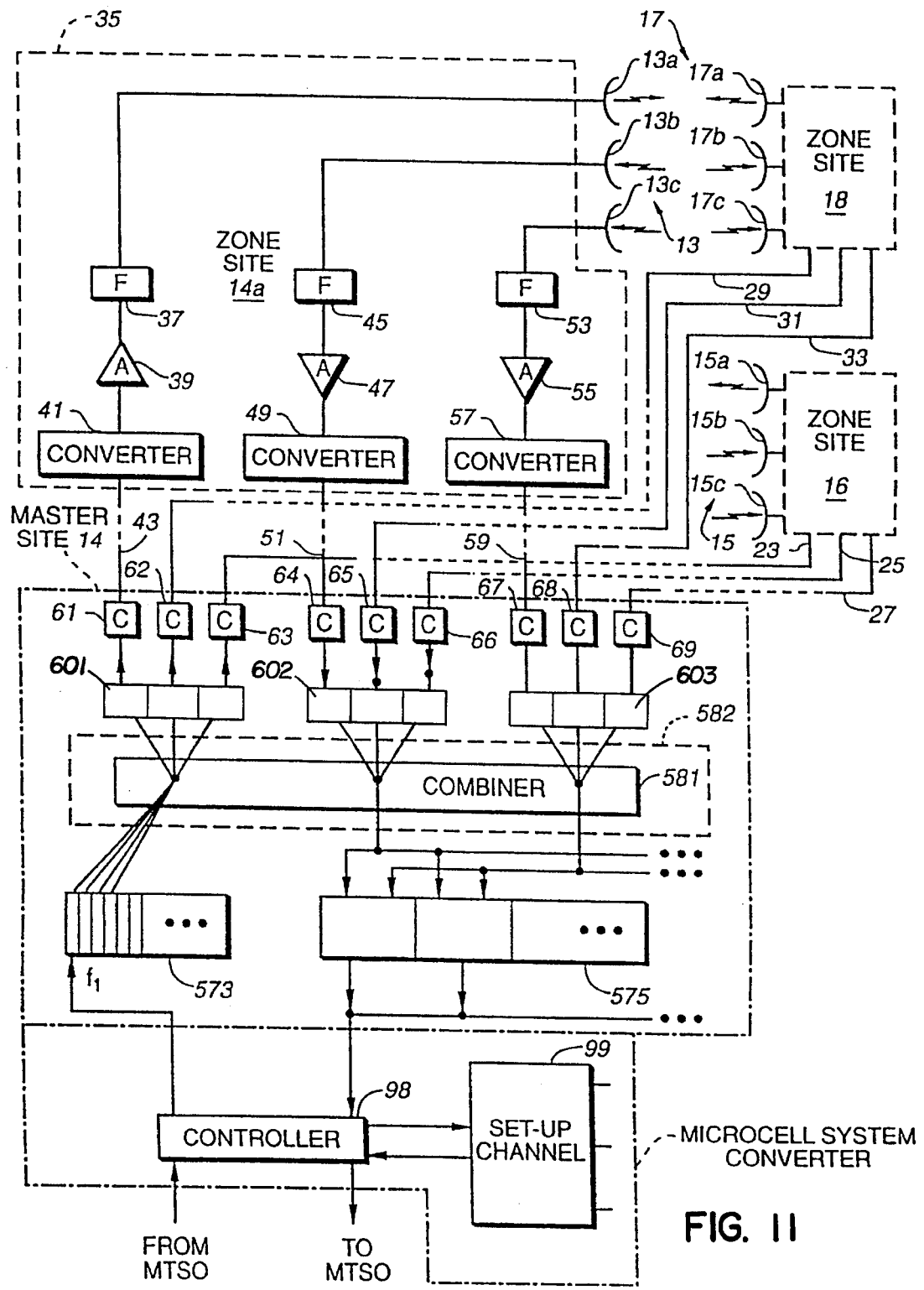
FIG. 11 is a schematic block diagram of the CDMA system including a delay module according to the present invention.

Refer now to FIG. 11. FIG. 11 is a schematic block diagram of the electronics of a CDMA system according to the present invention with the addition of a time delay module which serves to reduce interference times. The functions of the components in FIG. 11 are substantially the same as the functions of the components in FIG. 10. The components having the same functions in FIG. 10 are shown with the same numeral references, and the functions of these components are not described here.

Those skilled in the art will recognize that land-based cellular transmission experiences signal fading that typically consists of the Rayleigh fading component with a direct N component. In the multiple transmitter arrangement of the present invention, there is an area within the preferred cell that falls within the zone of influence of all three antenna sets designated by lines 531–533 in FIG. 9. As a result, multiple signals originating from three antenna sets arrive almost simultaneously at the mobile receiver from many directions with many different transmission delays. In most situations, the delay between the received signals will be large enough to allow a correlator, of a construction well-known to those skilled in the art (not shown), to differentiate among and combine the signals. However, as the size of the cell shrinks, the delay between the signals becomes too small to allow the correlator to function properly. At the UHF frequency bands usually employed for mobile radio communications, including those of cellular mobile systems, significant phase differences in signal traveling on different paths may occur. The possibility for destructive summation of signals may result.

In a CDMA cellular telephone system, high modulation allows many different production paths to be separated, provided the difference in path propagation delays exceed the modulation chip duration, or one bandwidth. As an example, when pseudo noise (PN) modulation is employed as the preferred modulation means, if a PN chip rate of one MHz is used, the full spread spectrum processing gain, equal to the ratio of the spread bandwidth to the system data rate, can be employed against paths that differ by more than one microsecond in path delay from the desired path. A microsecond path delay differential corresponds to differential path distance of 1,000 feet. The urban environment typically provides differential path delays in excess of one microsecond, and up to 1–20 microseconds are reported in some areas.

In the instant invention, the signal transmitted by each antenna set is preferably a direct sequence spread spectrum signal modulated by a PN sequence clock at a predetermined rate, which in the preferred embodiment is 1.25 MHz. A property of the PN sequence as used in the present invention is that discrimination is provided against multi-path signals. When the signal arrives at the mobile receiver after passing through more than one path, there will be a difference in reception time of the signals. This reception time difference corresponds to the difference in distance divided by the speed of light. If this time difference exceeds one microsecond, then a correlation process can be employed to discriminate against one of the paths.

As discussed above, however, smaller cell size decreases the reception time difference. In order to ensure an initial time difference in excess of one microsecond between each of the three signals being transmitted from the exemplary antenna sets of the cell, delay module 601 is advantageously employed to ensure the appropriate transmission delay between the signals being transmitted by antenna sets 13, 15 and 17. Delay module 601 is constructed in a manner well-known to those skilled in the art. Delay module 601 is shown comprising time delay circuits for each of the three zone sites. However, those skilled in the art will recognize that the number of required delay circuits corresponds to the number of transmitting antenna, minus one. Corresponding delay modules 602 and 603 are employed to delay the signals arriving from the zone cites. These modules allow correlation and combination of signals transmitted from the mobile unit in the cell to the three antenna sets. Those skilled in the art will recognize that modules 601–603 may be placed in other locations in the reception and transmission lines and may include or work in conjunction with correlator and/or combiner modules.

Various modifications of the invention, in addition to those shown and described herein, will be apparent to those skilled in the art from the foregoing description and accompanying drawings. Such modifications are intended to fall within the scope of the appended claims.

What is claimed is:

1. A cellular telephone system, comprising:

(a) a plurality of cells, each of the cells being comprised of a plurality of zones, each of the cells having an assigned set of identification codes, and each of the identification codes being used to encode radio frequency (RF) signals communicated to a mobile telephone within the cell;

(b) at least one antenna suitably arranged and positioned within each zone and configured to limit propagation of radio frequency (RF) signals radiated therefrom to substantially within pre-defined boundaries of the zone;

(c) means, within each cell and coupled to the antenna, for transmitting and receiving the RF signals at assigned frequencies to communicate with mobile telephones within the zone, wherein a plurality of the mobile telephones simultaneously use an identical assigned frequency and a different one of the identification codes assigned to the cell;

(d) means, within each cell and coupled to the means for transmitting and receiving, for maintaining communications with the mobile telephones by activating and deactivating transmissions to the mobile telephones as they move from zone to zone while using the same identification codes for each of the mobile telephones; and (e) means, within each cell and coupled to the means for transmitting and receiving, for maintaining communications with the mobile telephones by changing the identification codes for each of the mobile telephones as they move from cell to cell.

2. The cellular telephone system as set forth in claim 1 above, wherein the antenna is located on a periphery of the zone and is pointed into a center of the zone to substantially limit propagation of signals to the boundaries of the zone.

3. The cellular telephone system as set forth in claim 1 above, wherein the zones are arranged in a manner to create a substantially linear coverage for the cell.

4. The cellular telephone system as set forth in claim 1 above, further comprising:

means for monitoring one or more characteristics of the RF signals received by the antenna from a mobile telephone; and means for deactivating transmissions to the mobile telephone in all zones in a particular cell except for a zone in the cell selected on the basis of the monitored characteristic.

5. The cellular telephone system as set forth in claim 1 above, wherein transmissions of the RF signals to a particular mobile telephone in each of the zones of a particular cell occurs on the same assigned frequency, thereby eliminating handoffs between zones in the cell.

6. A cellular telephone system, comprising:

(a) at least one cell, each of the cells being comprised of at least one zone;

(b) transceiver means, coupled to an antenna within a particular zone, for transmitting and receiving radio frequency (RF) signals at assigned frequencies to communicate with mobile telephones within the zone, wherein a plurality of the mobile telephones simultaneously use an identical assigned frequency, and wherein the antenna is suitably arranged and positioned within the zone and configured to limit propagation of the RF signals radiated therefrom to substantially within pre-defined boundaries of the zone;

(c) a base site, coupled to one or more of the zones via a communications link, for maintaining communication with the mobile telephones as they move from zone to zone, wherein the communications link further comprises first frequency conversion means at the base site for converting signals received at the base site from a cellular phone frequency to a first frequency, transmission means for transmitting the converted signals from the base site to the transceiver means in the zone via the link and for transmitting the signals from the transceiver means in the zone to the base site via the link, and second frequency conversion means at the zone for converting signals at the zone from the first frequency to the cellular phone frequency.

7. The cellular telephone system as set forth in claim 6 above, wherein the first frequency is a microwave frequency.

8. The cellular telephone system as set forth in claim 6 above, wherein the first frequency is an optical frequency.

9. The cellular telephone systems set forth in claim 6 above, wherein the first frequency is a baseband frequency.

* * * * *

UNITED STATES PATENT AND TRADEMARK OFFICE
CERTIFICATE OF CORRECTION

PATENT NO.   :   5,504,936

DATED        :   April 2, 1996

INVENTOR(S)  :   William C. Lee

It is certified that error appears in the above-identified patent and that said Letters Patent is hereby corrected as shown below:

Column 4, line 47, after "a" (second occurrence) delete "10".
Column 10, line 31, before "three" delete the quotation mark (").
Column 10, line 31, after "time" delete the quotation mark (").
Column 10, line 50, change "Corresponds" to --corresponds--.
Column 15, line 33, after "interference" and before "times." insert --caused by reception of multiple signals at differing--.

Signed and Sealed this

Nineteenth Day of November, 1996

Attest:

BRUCE LEHMAN

Attesting Officer

Commissioner of Patents and Trademarks